United States Patent [19]
Schwarz

[11] Patent Number: 6,106,386
[45] Date of Patent: Aug. 22, 2000

[54] AIR FLOW MIXING APPARATUS

[75] Inventor: Stefan Schwarz, Rochester Hills, Mich.

[73] Assignee: Valeo Climate Control, Inc., Auburn Hills, Mich.

[21] Appl. No.: 09/036,245

[22] Filed: Mar. 6, 1998

[51] Int. Cl.⁷ ...................................................... B60H 1/00
[52] U.S. Cl. ........................... 454/143; 454/261; 454/269; 454/265
[58] Field of Search ..................... 454/143, 261, 454/269, 265, 75, 145, 156

[56] References Cited

U.S. PATENT DOCUMENTS

| | | | |
|---|---|---|---|
| 2,142,134 | 1/1939 | Kurth | 454/261 |
| 2,400,617 | 5/1946 | Wheller | 454/261 |
| 2,793,812 | 5/1957 | McDonald | 454/261 |

FOREIGN PATENT DOCUMENTS

| | | | |
|---|---|---|---|
| 000614661 | 1/1961 | Italy | 454/261 |
| 1300-268 | 3/1987 | U.S.S.R. | 454/261 |

*Primary Examiner*—Harold Joyce
*Assistant Examiner*—Derek S. Boles
*Attorney, Agent, or Firm*—Morgan & Finnegan, L.L.P.

[57] ABSTRACT

A mixing device for mixing two air flows has plural first flexible curtains disposed between first edge regions of alternate pairs of air guides, and a plurality of second flexible curtains disposed between second edge regions of alternate pairs of air guides. Moveable air guides in each pair may be moved to control the flow of air.

12 Claims, 3 Drawing Sheets

AIR FLOW MIXING APPARATUS

FIELD OF THE INVENTION

The present invention relates to apparatus for mixing two air flows, and more specifically but not exclusively to apparatus for controlling the proportions of two air flows to be mixed in a vehicle heating or air conditioning apparatus.

BACKGROUND TO THE INVENTION

In typical vehicle heating systems, a first air flow is passed through a heat exchanger, heated from the vehicle engine coolant, and this air flow is mixed with a second air flow to provide a temperature-controlled output to the vehicle cabin. The second air flow may be derived directly from outside the vehicle or may be a flow derived from a evaporator of an air conditioning device.

Typically, the first air flow is incident on one side of a mixing chamber and the second flow is incident on the second opposite side of the air mixing chamber.

The disadvantage of this arrangement is that the temperature distribution across the air mixing chamber is uneven due to stratification effects especially where one of the air flows is substantially greater than the other.

It is possible to overcome this problem at least to a certain extent, by the use of baffles. However, baffles have two disadvantages, namely the reduction of air flow volume caused by the baffle and the undesirable noise caused by passage through the baffle.

Accordingly, it is an object of the present invention to provide a mixing device which at least partly overcomes the abovementioned problems.

SUMMARY OF THE INVENTION

It is provided a mixing device for mixing a first and a second air flow, the mixing device having plural fixed air guides and plural movable air guides, each movable air guide being intercalated between a respective pair of fixed air guides, wherein each air guide has a first edge region, a second edge region and a third edge region, said first air flow being incident in use, at said first edge region, said second air flow being incident, in use, at said second edge region and wherein air flow emanating, in use, from said third edge region constitutes a mixed output, said mixing device further comprising a plurality of first flexible curtains disposed between the first edge region of alternate contiguous pairs of air guides and a plurality of second flexible curtains disposed between second edge regions of alternate contiguous pairs of air guides and means for moving said movable air guides with respect to said fixed air guides between a first position wherein said movable air guides abut one respective adjacent fixed air guide and a second position in which they abut the other adjacent fixed air guide.

Preferably each air guide is a triangular plate.

Preferably the first and second flexible curtains are of plastic materials.

Preferably the means for moving the movable air guides comprises a shaft to which the movable air guides are secured.

BRIEF DESCRIPTION OF THE DRAWINGS

An embodiment of the invention will now be described with reference to the accompanying drawings in which.

DESCRIPTION OF PREFERRED EMBODIMENTS

Figure 1:
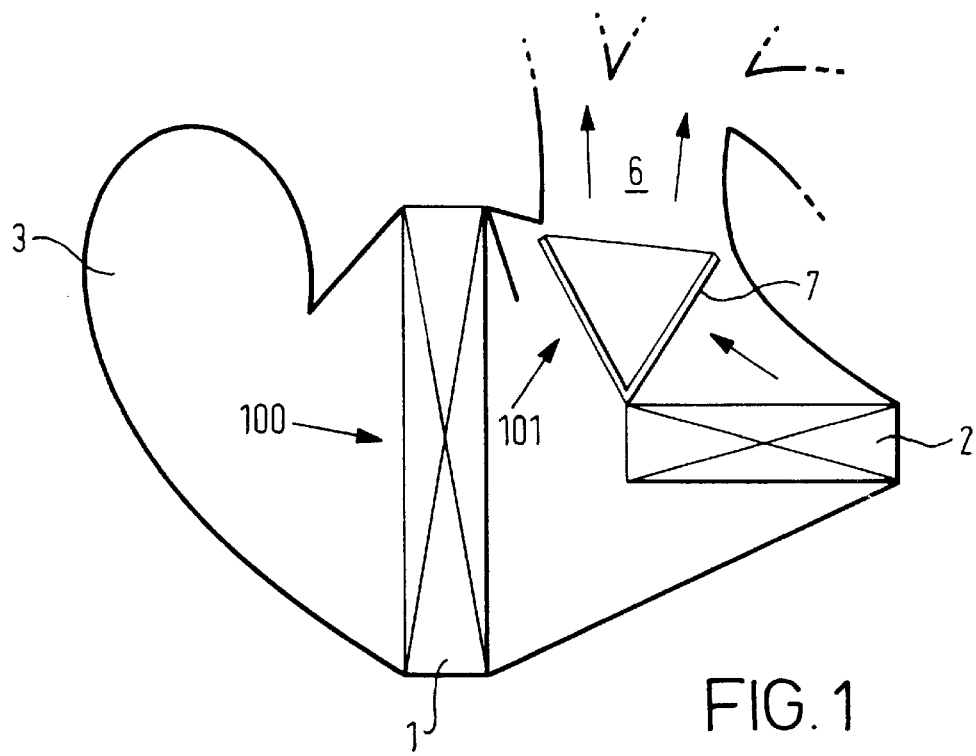
FIG. 1 shows a cross-sectional view of a vehicle air conditioning system to which the present invention may be applied.

In the Figures like reference numerals refer to like parts.

Referring first to FIG. 1 an air-conditioning evaporator 1 is supplied with refrigerant in known fashion. A heater radiator 2 is supplied with coolant from an associated engine in known fashion. A blower 3 which may have an inlet derived from the ambient air or from the vehicle cabin, provides an input air flow 100 which passes through the evaporator to form a cooled output air flow 101. An air mixing device 7 determines the proportion of the cooled air flow 101 which flows directly into the mixing chamber 6 with respect to the proportion of air which passes first through the heater radiator 2.

Figure 2:
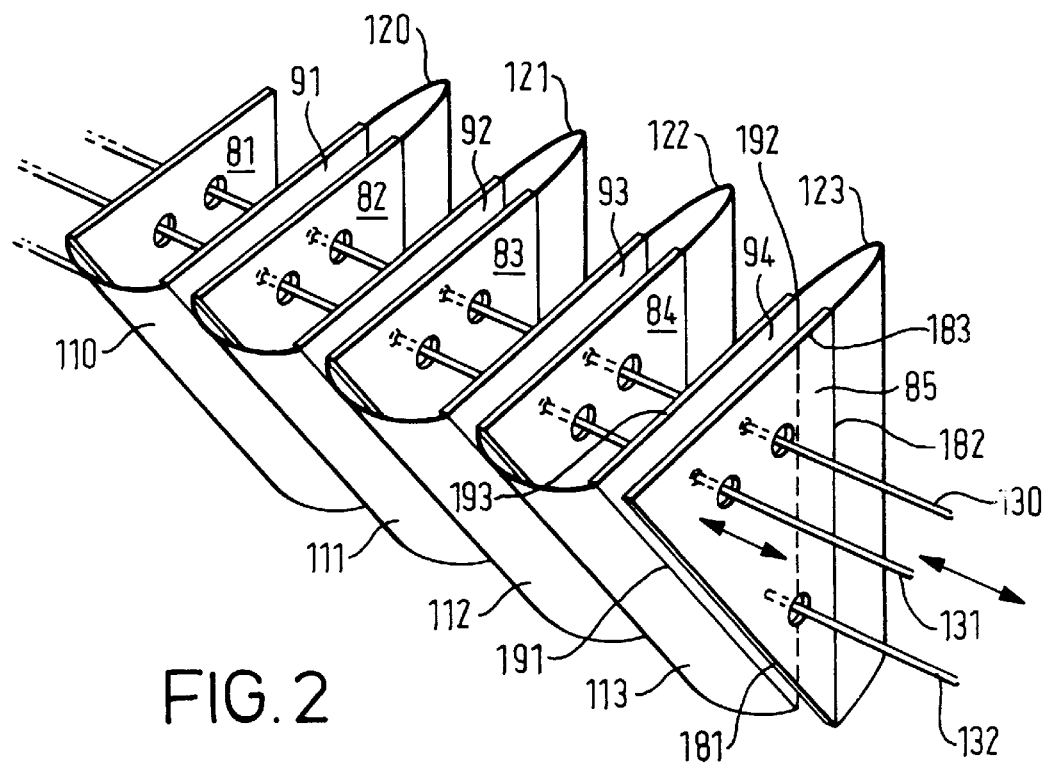
FIG. 2 shows a partial respective view of an air mixing device in accordance with the present invention.

Referring now to FIG. 2, the mixing device consists of a plurality, here 5, of fixed triangular air guides 81–85 and a plurality, here 4, of movable triangular air guides 91–94. The air guides are disposed substantially mutually parallel and have first edge regions 181, 191 defining an inlet region for cooled air directly from the evaporator and second edge regions 182, 192 defining an inlet region for heated air from the radiator 2. Third edge regions 183, 193 define an air outlet for the mixer. The movable air guides are each disposed between two fixed air guides.

It will be understood that the particular form of the air guides will be selected according to the application. Thus, triangularity is not an essential feature of the invention.

Flexible first curtain members 110–113 are secured to the first edge region 191 of each fixed air guide 81–85 and extend to the edge region 181 of one of the adjacent movable air guides 91–94. Each pair of air guides joined at the first edge region 191 by the first curtain member 110–113 are joined to the adjacent pair of air guides by a second curtain member 120–123 which extends between the second edge regions 182, 192. Thus, viewed from the third edge region (see FIG. 4), the air mixer forms a continuous serpentine path formed by a fixed air guide 81, a first curtain member 110 leading to the adjacent movable air guide 91, the moveable air guide 91, a second curtain member 120 leading to the next fixed air guide 82 and so on.

Three shafts 130–2 pass through the air guide members 81–85, 91–94. The movable air guides 91–94 are secured to the shafts. Translation of the shafts 130–2 causes the movable air guides 91–94 to move between a first position in which they abut one adjacent fixed air guide to a second position where they abut the other adjacent fixed air guide. In the first position one of the first and second curtain members is extended, and in the second, the other of the first and second curtain members is extended as will now be described with reference to FIGS. 3–5.

Figure 3:
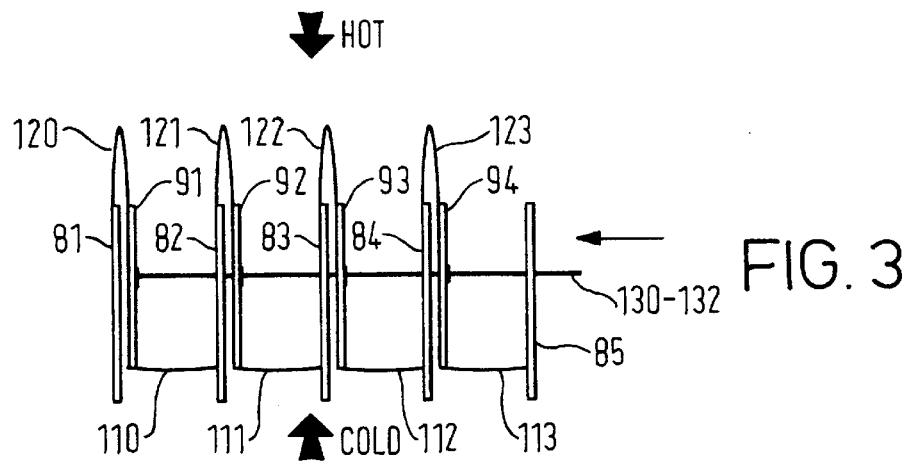
FIG. 3 shows the device of FIG. 2 in the full hot condition.

FIG. 3 shows the first position in which the first movable air guide member 91 abuts the first fixed air guide member

81, the second movable air guide member 92 abuts the second fixed air guide member 82 and so on. This is achieved by moving the shafts 130–2 to the left, as shown in the drawings. In this arrangement, the first curtain members 110–3 are extended, to substantially screen the cold air inlet, whereas the second curtain member 120–3 are furled tightly to provide little or no screening effect on the hot air inlet. In this situation, the cooled air from the evaporator strikes the extended first curtain members 110–113 and is thereby substantially prevented from passing through the air mixer to the outlet region. Warmed air from the heater is not impeded by the furled second curtain members 120–3.

Figure 4:
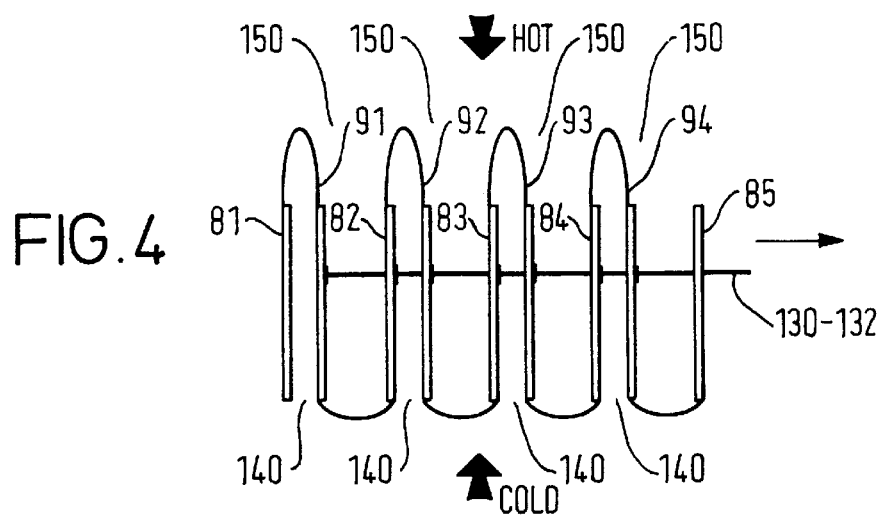
FIG. 4 shows the mixing device of FIG. 2 in the intermediate position.

FIG. 4 shows an intermediate position in which each of the movable air guide members 91–94 is spaced from the adjacent fixed air guide members 81–5. Gaps 140 on the cold air side between air guide members allow cold air to pass between the guide members, and gaps 150 on the hot air side allow hot air to pass in similar fashion. However, the gaps allow both hot and cold air to flow across the whole lateral extent of the mixer, so that there is little preponderance of hot air on one side of the mixer output, or cold air on the other side of the mixer output.

Figure 5:
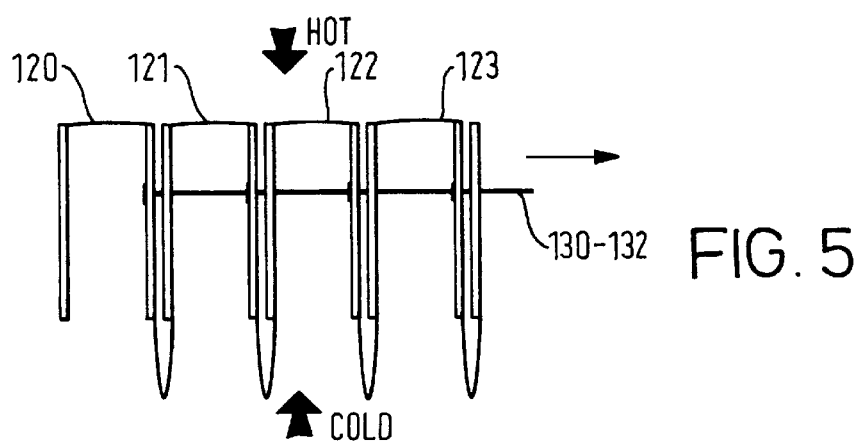
FIG. 5 shows the air mixing device of FIG. 2 in the full cold position.

FIG. 5 shows a position analogous to FIG. 3, but with the second curtain members 120–3 extended to close the hot air inlet. This is achieved by using the shafts 130–2 to the right as shown in the drawings.

Figure 6:
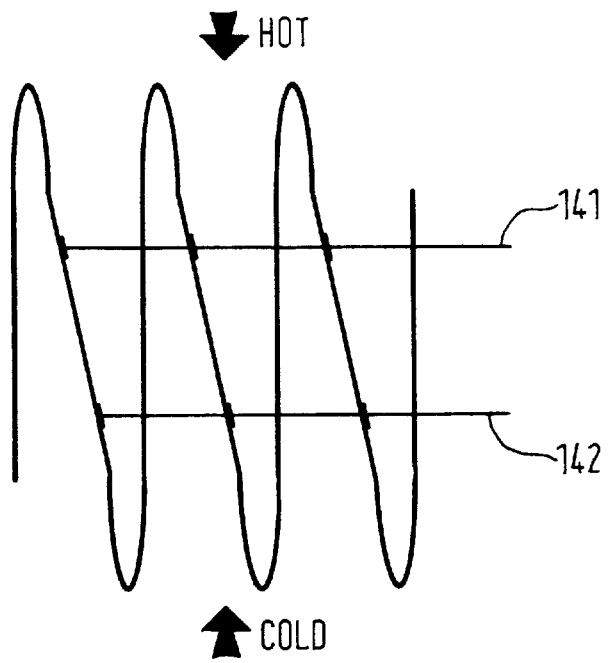
FIG. 6 shows a cross-sectional view through a second embodiment of an air mixing device in accordance with the present invention.

In the arrangement shown in FIG. 6, two shafts one for 141, 142, are used. Each shaft is secured to the moveable air guide members but the shafts are independently moved so that the air guide members may be pivoted about a central axis. As shown in the drawing, the upper shaft 141 is urged as far as possible to the left and the shaft 142 as far as possible to the right. This causes both of the curtains to be furled so as to provide the least possible resistance to both hot and cold air flow.

Figure 7:
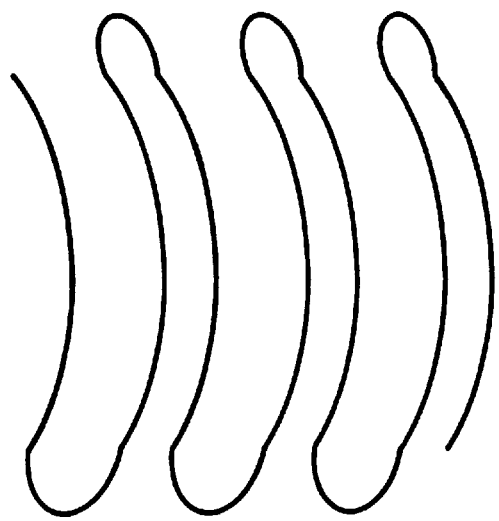
FIG. 7 shows a cross-sectional view through a third embodiment of an air mixing device in accordance with the present invention.

Referring now to FIG. 7, an alternative structure is shown in which the fixed moveable air guide members are arcuate in cross-section.

I claim:

1. A mixing device for mixing a first and a second air flow comprising:
    a plurality of fixed air guides and a plurality of movable air guides, each movable air guide being intercalated between a respective pair of fixed air guides, wherein each air guide has a first edge region, a second edge region and a third edge region;
    a plurality of first flexible curtains disposed between the first edge region of alternate contiguous pairs of air guides and a plurality of second flexible curtain disposed between the second edge region of alternate contiguous pairs of air guides; and
    a plurality of shafts for moving said movable air guides with respect to said fixed air guides between a first position wherein said movable air guides abut one respective adjacent fixed air guide and a second position in which said movable air guides abut the other adjacent fixed air guide.

2. A mixing device according to claim 1, wherein each one of the fixed and movable air guides is a triangular plate.

3. A mixing device according to claim 1, wherein the first and the second flexible curtains are made of plastic material.

4. A mixing device according to claim 1, wherein the shafts are secured to the movable air guides.

5. An apparatus for mixing air flow comprising:
    a plurality of fixed air guides and a plurality of movable air guides, each of the movable air guides being between two of the fixed air guides, wherein the fixed and movable air guides each having a first edge region defining an inlet region for cool air, a second edge region defining an inlet region for heated air, and a third edge region defining an air outlet for the mixing the cool air and the hot hair; and
    a plurality of first curtains, each of the first curtains connecting one of the fixed air guides with the adjacent movable air guide, and a plurality of second curtains, each of the second curtains connecting the movable air guide to the other adjacent fixed air guide.

6. An apparatus according to claim 5, further including a plurality of shafts passing through each of the fixed and the movable air guides wherein movement of the shafts causes the movable air guides to move between a first position in which the movable air guide abut one the adjacent fixed air guide and a second position in which the movable air guide abut the other adjacent fixed air guide.

7. An apparatus according to claim 6, wherein the first position is achieved by moving the shafts in a direction such that the first curtain members are extended to substantially screen the cold air inlet, and the second position is achieved by moving the shafts in a direction such that the second curtain members are extended to close the hot air inlet.

8. An apparatus according to claim 5, wherein the fixed and the movable air guides are of triangular shape.

9. An apparatus according to claim 5, wherein the fixed and the movable air guides are substantially parallel to each other.

10. An apparatus according to claim 6, wherein the apparatus comprising an upper and an lower shaft secured to the movable air guides, wherein each shaft is moved independently so that the air guide members may be pivoted about a central axis.

11. An apparatus according to claim 5, wherein the fixed movable air guides are arcuate in cross-section.

12. An air mixing device for a motor vehicle comprising the apparatus of claim 5.

\* \* \* \* \*